June 27, 1967 J. R. NEHRING ET AL 3,327,709

TRANSFUSION AND BLOOD STORAGE SET

Filed July 19, 1962 4 Sheets-Sheet 1

INVENTOR.
JOHN R. NEHRING
THADDEUS S. SENKOWSKI

BY

Kane, Dalsimer and Kane
ATTORNEYS

INVENTORS
JOHN R. NEHRING
THADDEUS S. SENKOWSKI
BY
Kane, Dalsimer and Kane
ATTORNEYS June 27, 1967 J. R. NEHRING ETAL 3,327,709

TRANSFUSION AND BLOOD STORAGE SET

Filed July 19, 1962 4 Sheets-Sheet 3

INVENTOR.
JOHN R. NEHRING
THADDEUS S. SENKOWSKI
BY

Kane, Dalsimer and Kane
ATTORNEYS

TRANSFUSION AND BLOOD STORAGE SET

Filed July 19, 1962 4 Sheets-Sheet 4

INVENTORS
JOHN R. NEHRING
THADDEUS S. SENKOWSKI
BY
Kane, Dalsimer and Kane
ATTORNEYS 3,327,709

TRANSFUSION AND BLOOD STORAGE SET

John R. Nehring, Linden, and Thaddeus Stanislaus Senkowski, Cedar Grove, N.J., assignors to Becton, Dickinson and Company, East Rutherford, N.J., a corporation of New Jersey Filed July 19, 1962, Ser. No. 210,903
9 Claims. (Cl. 128—214)

This invention relates to a structurally and functionally improved liquid collecting, dispensing and storage apparatus primarily intended for use in connection with human blood.

It is a primary object to provide such an apparatus and which will involve tubes. These, according to the present teachings may be segregated into different sections each containing a sample of blood or other body liquid.

Another object is to design a structure in which the sections of tube segregated from each other may be readily separated and in which separation practically none of the contained liquid will be spilled onto or smudged against supporting surfaces, the hands of the physician or otherwise.

A further object is that of furnishing an improved container to receive blood; the container being advantageously usable for the storage of liquid such as blood and its subsequent distribution to a recipient.

An additional object is that of providing an improved transfusion or blood container set of which the segregating structure may form a part; the entire assembly embracing a sterile and simple design capable of ready and economical manufacture.

Our invention also contemplates the provision of an improved transfusion and blood storage set having an outlet or inlet tube encased in sealed flaps having handle tabs of improved construction that can be readily grasped to facilitate opening the flaps. It additionally contemplates the provision of improved cannula assemblies, having a rigid casing made of segmental parts coupled together by snap-action latches. A removable sheath is applied to the cannula assembly so that when it is removed, it cannot again be reapplied. In one aspect of our invention, the blood collecting set has a blood sampling cannula connected thereto and projecting laterally therefrom, and having a sheath removably assembled therewith as indicated above, so no blood sample can be drawn therefrom until the sheath is removed.

With these and other objects in mind reference is had to the attached sheets of drawings illustrating practical embodiments of the invention and in which:

FIG. 1 is a face view of a complete assembly;

FIGS. 2, 3, 4 and 5 are transverse sectional views in enlarged scale taken along the lines 2—2, 3—3, 4—4 and 5—5 respectively and in the direction of the arrows as indicated in FIG. 1;

Figure 1:
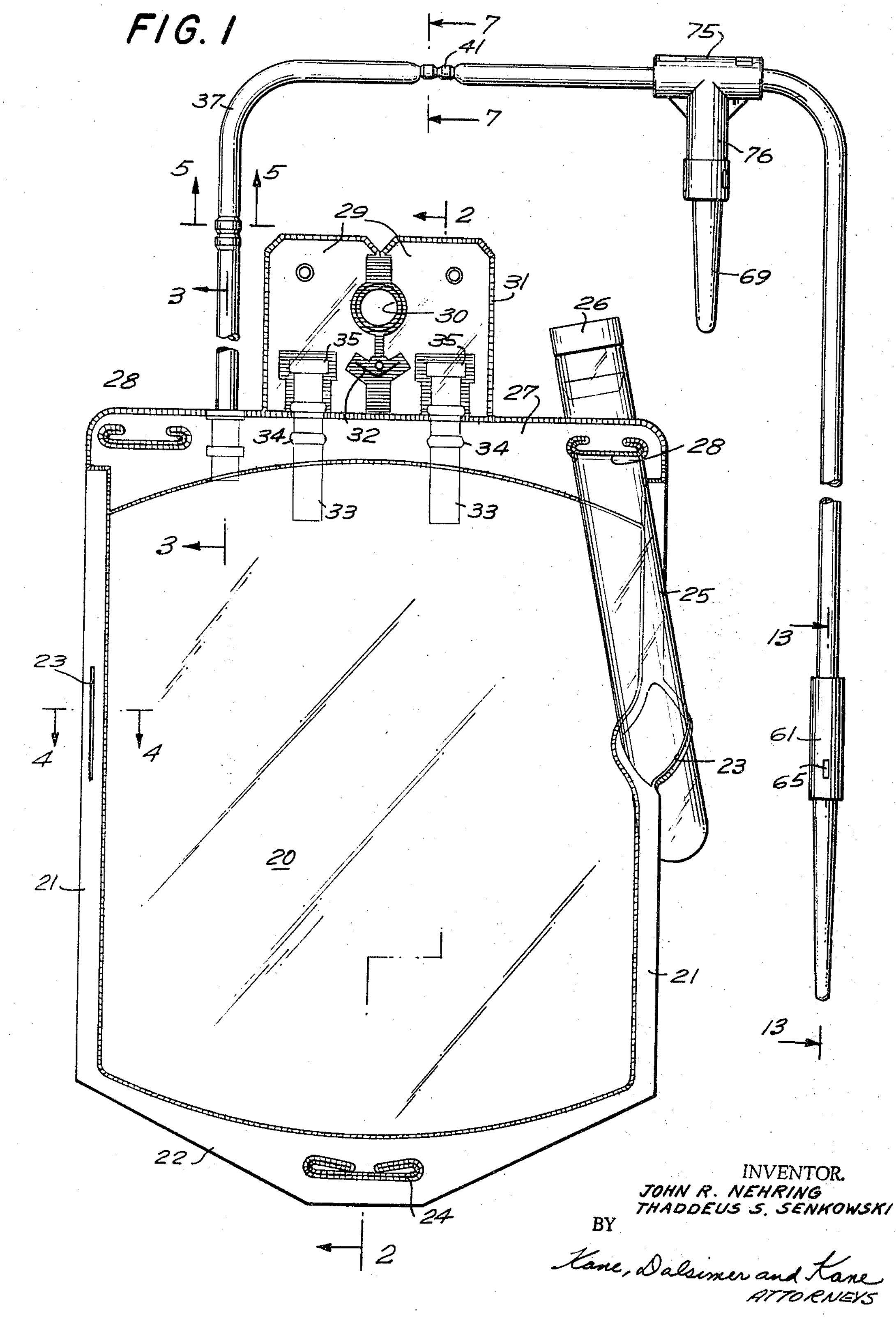
Figures 2, 3, 4, 5, 6, 7, 8, 11, 12, 13:
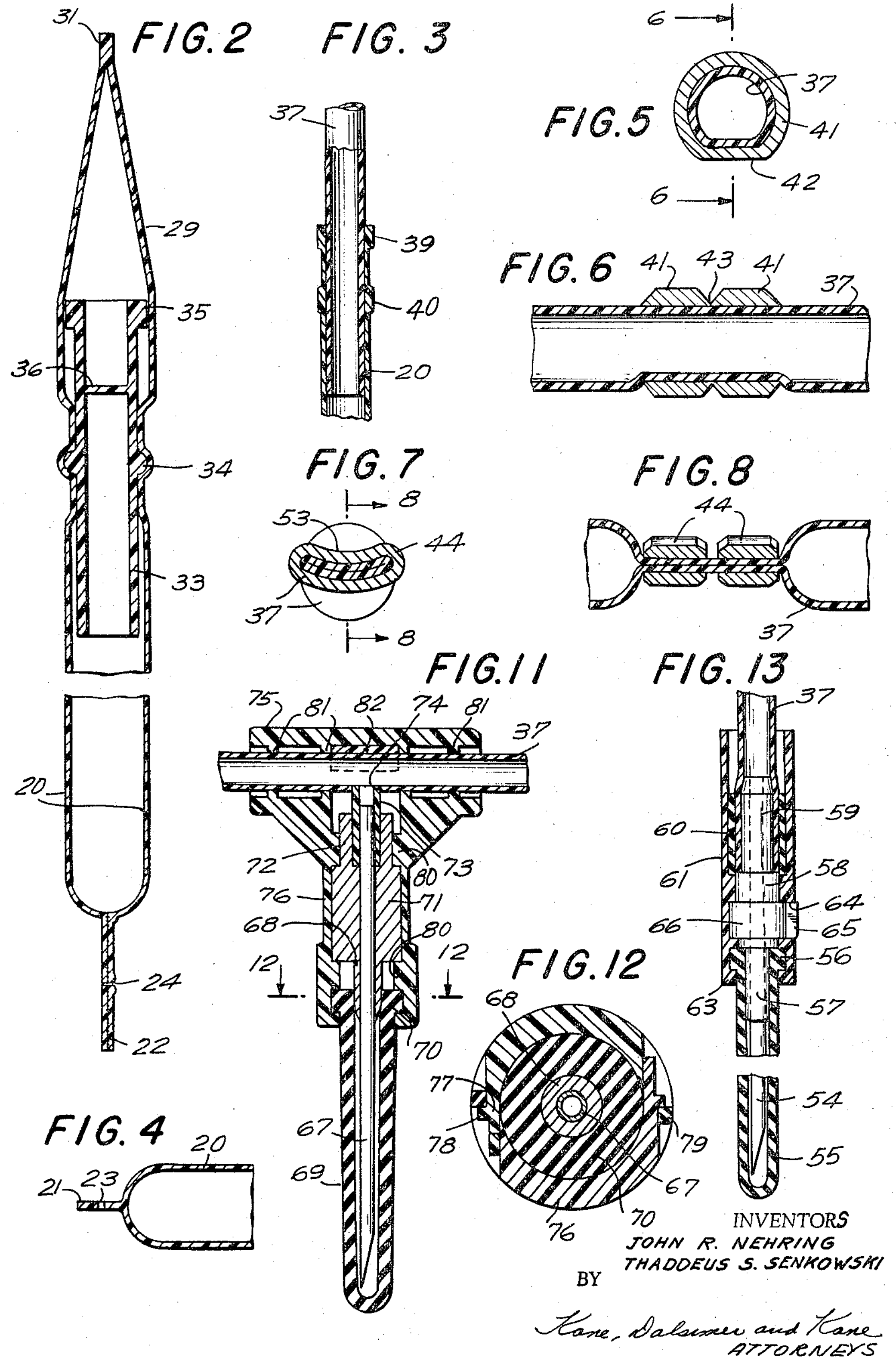
FIG. 6 is a sectional side view taken along the line 6—6 in the direction of the arrows as indicated in FIG. 5.
FIG. 7 is again a transverse section taken along the line 7—7 in the direction of the arrows as indicated in FIG. 1 and showing the parts in enlarged scale.
FIG. 8 is a sectional side view along the line 8—8 in the direction of the arrows as indicated in FIG. 7.
FIG. 11 is a sectional side view of the needle and holder as in FIG. 9.
FIG. 12 is a transverse sectional view taken along the line 12—12 in the direction of the arrows as indicated in FIG. 11.
FIG. 13 is a sectional side view taken along the line 13—13 in the direction of the arrows as indicated in FIG. 1.

Referring primarily to FIGS. 1 and 2 it will be seen that a receptacle has been shown as embracing outer side walls 20. These are preferably in the form of separate sheets of suitable plastic material in which case all four edge zones of the sheets will be secured to each other by, for example, dielectric sealing. Thus, in effect, relatively narrow zones 21 adjacent to side edges of the receptacle will be provided while a deeper bottom zone 22 will be furnished. Through each of the former, slits 23 may be provided while similarly a slit 24 may be formed in the center portion of zone 22. The latter opening will permit of the suspension of the receptacle from a suitable support. One or both of openings 23 may provide for encirclement and retention of the lower portions of receptacles conveniently embracing glass bodies 25 which have their outer ends sealed by stoppers 26 and their interiors under a condition of vacuum. These receptacles are of a type as shown in the prior United States patent to Joseph J. Kleiner, 2,460,641, on blood collecting apparatus, dated Feb. 1, 1949.

The upper ends of bodies 25 may extend at an angle across the upper sealed zone 27 and through openings 28 formed therein so that one or more of these evacuated units may be included in the assembly. The upper edges of walls 20 each have extensions registering with each other as indicated at 29. Two pairs of extensions are conveniently provided to furnish flap portions. An opening 30 is conveniently formed centrally of these flaps and serves as a support in a manner similar to opening 24. The edge zones of the tabs or flaps 29 are subjected to heat and pressure for proper intervals to furnish marginal zones of sealing 31. Indented or scored portions 32 may be included in the flaps to permit separation of the latter from each other.

Access to the interior of the receptacle is provided by one or more tubes 33, which are relatively rigid and extend through the zone of sealing 27 with their upper ends in the area of the flaps 29. Conveniently, these tubes will present annular exterior flanges or beads 34 to assure of a proper sealing within the zone 27 at the upper edge of the receptacle and thus prevent axial movements of the tubes. The upper ends of the latter may be defined by flanges 35. Their bores may be obstructed by transversely extending partitions 36.

Additionally communicating with the interior of the receptacle is the inner end of a donor tube 37 conveniently formed of vinyl and as in FIG. 3 being heat sealed in position between walls 20. Enlarged portions 39 and 40 will prevent axial shifting of the tube 37. This tube is, in the present exemplification, subdividable into sections or aliquots, each containing samples of blood or other liquid disposed within the tube. It will of course be understood that the latter might form a part of an assembly different from the one primarily shown in FIGS. 1 and 2 herein.

Structures associated with the tube permitting the latter to be subdivided into a number of sections or compartments, with subsequent separation of latter from each other, may take one of several forms. These have been shown in detail in FIGS. 5 to 8 inclusive and under sealing procedures in FIGS. 15 and 16. One form, as in FIGS. 5 and 6, will include a pair of ring-shaped members 41 preferably integral with each other and having an exterior annular groove 43 in line with which they may be separated. They are formed of a suitable ductile metal of sufficient rigidity to maintain deformation after the latter condition has once been established. The tube is threaded through them and they are then flattened to a slight extent as indicated at 42 in FIG. 5 so as to frictionally engage the tube surface and prevent axial movement of that tube with respect to their bodies once the position of the securing member has been established.

The same frictional gripping expedient may be resorted to in connection with the structure shown in FIG. 8, in which ring-shaped members 44 initially separated from each other are mounted on the tube. In any event, it is preferred that if a pair of units are employed, they be disposed closely adjacent to each other. A pair of spaced assemblies may be employed as in FIG. 1 to merely establish a single compartment. Otherwise, the segregating members may be provided in sufficient numbers and under adequate spacing so that an optional number of aliquots will be furnished.

Figures 14, 15, 16, 17, 18, 19:
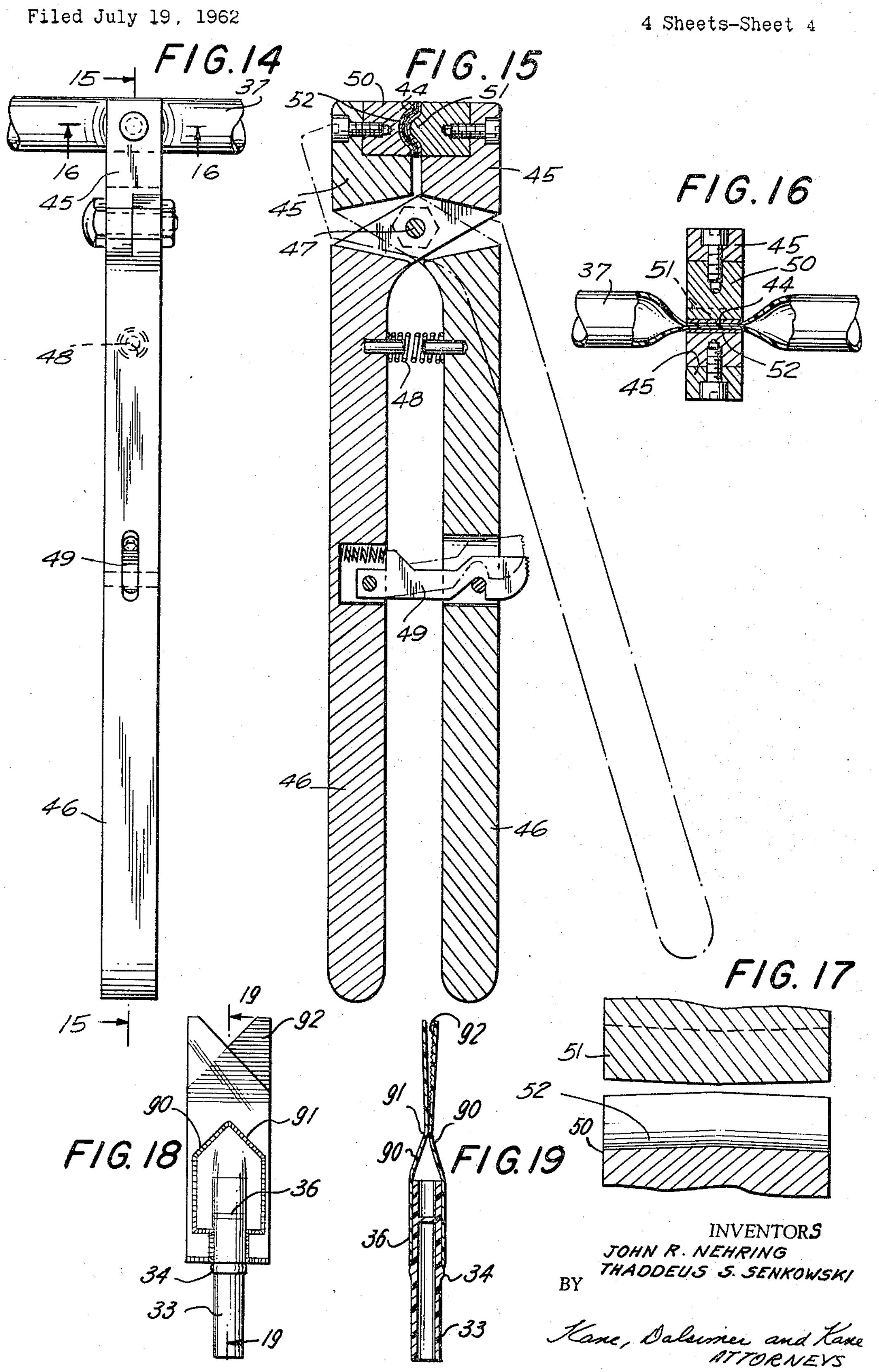
FIG. 14 is a side elevation of a plier or tool cooperable with the elements associated with the tube to subdivide the latter into sections.
FIG. 15 is a sectional side view taken along the line 15—15 in the direction of the arrows as indicated in FIG. 14.
FIG. 16 is a sectional side view taken along the line 16—16 in the direction of the arrows as also indicated in FIG. 14.
FIG. 17 is a sectional view through the tool jaws.
FIG. 18 is a fragmentary face view of another form of seal.
FIG. 19 is a sectional side view along line 19—19 and in the direction of the arrows of FIG. 18.

When it is desired to isolate tube sections from each other, then a tool of the type shown in FIGS. 14, 15 and 16 may be employed. That tool will conveniently include a pair of jaws 45 continued in the form of legs 46 pivotally connected together as at 47. The jaws are normally maintained in a separated condition by a spring 48. A latch 49 may maintain the jaws in closed position. Their working faces are conveniently formed by removable blocks 50, one of which provides a projection 51, with the other furnishing a complementary recess 52. The surfaces of these portions will be rounded to present raised central sections (shown in exaggerated manner in FIG. 17); the entire area being of width equal in area to that of a pair of closure members 41 or 44. Under these circumstances, the closure member is deformed as indicated at 53 in FIG. 7. It remains in this state and presents concave and convex parts to which the bore surfaces of the tube conform throughout an area such that those surfaces are an intimate sealing engagement. Thereupon the tube may be severed by a pair of scissors or otherwise by simply cutting along notch 43 as in FIG. 6 or in the space existing between units 44 as in FIG. 8. It is found as a result of this particular configuration that excess blood does not spill from the severed ends of the tube but rather is squeezed interiorly of the tube as the clamping member is crimped or deformed.

A needle assembly is coupled to the outer end of the the donor tube 37. This assembly will include a cannula 54 having a piercing end and of a gauge such that it may properly serve as a venous needle. The cannula is protected by a sheath 55 of rubber or plastic and having a base flange 56. The latter encircles the tip 57 of a hub forming a part of a tubular member 58, the inner end of which is reduced as at 59. The diameter of the latter is such that the tube 37 may encircle the same as in FIG. 13. The tube is maintained against detachment preferably by a rubber sleeve 60. Casing portions 61 of semi-circular section enclose the hub assembly as described. Recesses and projecting portions 62 form parts of these encasing members and serve as latch or detent structures in cooperation with each other to maintain the circular configuration after its parts are applied to each other. Adjacent their other ends, sections 61 are preferably formed with inwardly extending semi-circular flange portions 63. These overlap the base part 56, or sheath 55 with the assembly completed.

Finally, with respect to this unit it will be noted that casing sections 61 are identical in configuration. An opening 64 is provided through the casing adjacent its outer end. This opening receives an indicator 65 forming a part of the hub assembly and correlated to the bevel of the outer cannula end. Accordingly, with projection 65 extending through opening 64 and conveniently being of a contrasting color, a technician will have no difficulty in visualizing the direction in which the bevel at the outer end of the cannula extends. Hub member 58 may be provided with an outwardly extending shoulder portion 66 adjacent to the projection. This will lie within a correspondingly recessed surface of the casing as shown in FIG. 13. It follows that the entire hub assembly will be incapable of shifting with respect to the casing which will thus serve as a manipulating portion for the needle.

A further needle assembly forms a part of the apparatus and is mounted by tube 37 at a point short of its outer end and beyond the area in which the crimpable eyelets, or rings (FIGS. 5 to 8), are disposed. This additional needle assembly is shown to best advantage in FIGS. 9, 11 and 12. It serves as hereinafter brought out to charge the unit 25–26 with blood when such an end result is desired.

This second needle assembly will conveniently include a cannula 67 having a pointed outer end with its opposite end extending into and through a hub member involving a bored tip 68. A sheath 69 corresponding to sheath 55 and also of rubber or similar material is provided and has an enlarged base portion 70 which encircles tip 68 to enclose and maintain sterility of cannula 67. The hub also includes an enlarged central portion 71 which may be polygonal in section and a reduced rear portion 72. Cannula 67 extends rearwardly of this portion and is enclosed by sleeve 73 of vinyl or other suitable material.

Tube 37 is formed with an opening 74 aligned with the lumen of the cannula at its base end. As will be seen, especially in FIG. 11, the forward end of sleeve 73 extends between the adjacent surfaces of the cannula and reduced hub portion 72. At its inner end it is coupled by heat sealing with the tube 37 adjacent its opening 74. A holder or mounting formed of suitable plastic material corresponding to casings 61 encloses the parts in the zone of coupling involving cannula 67 and tube 37.

Figure 9:
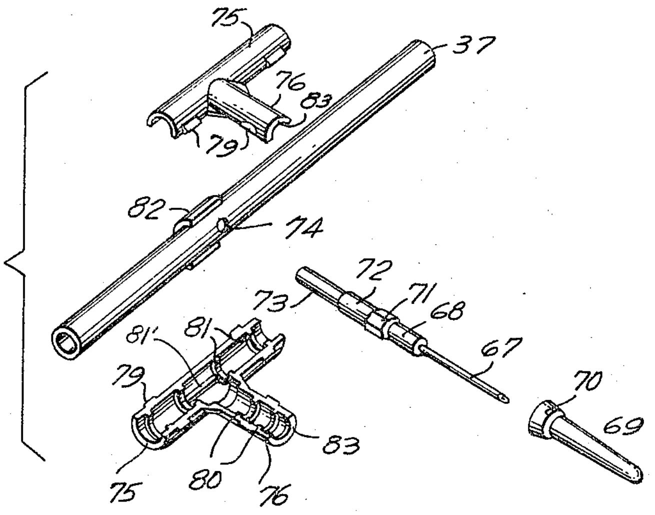
FIG. 9 is an exploded perspective view of an improved needle and holder assembly preferably included as part of the complete set.
Figure 10:
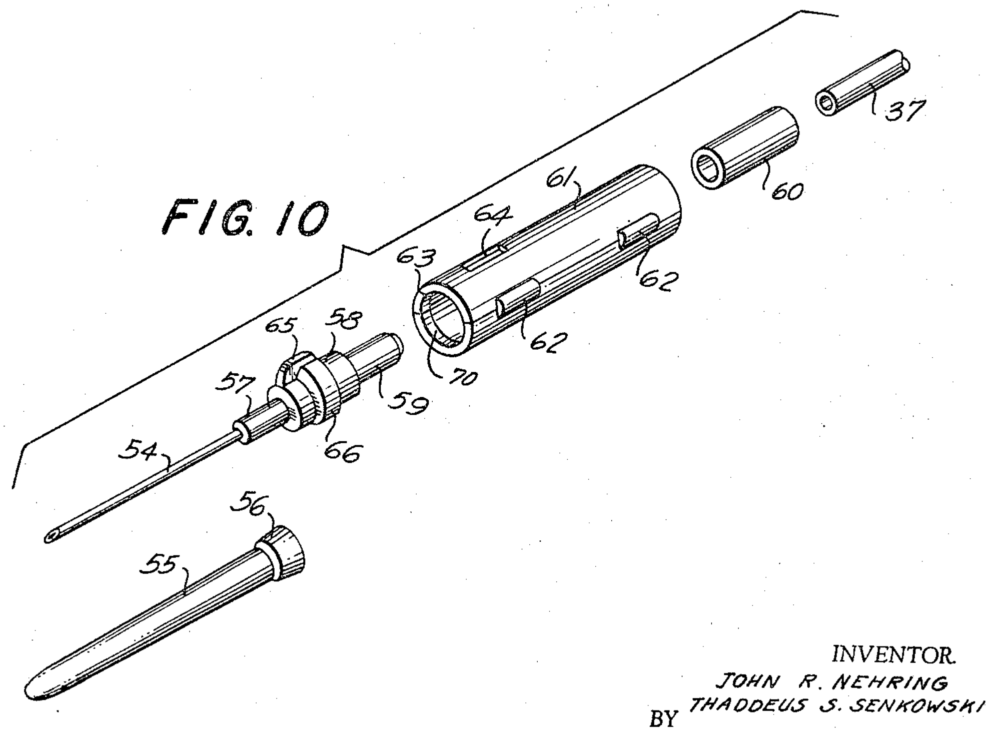
FIG. 10 is a similar view of a second needle and holder assembly included in the blood container or transfusion set.

The casing, as in FIG. 9, will involve identical sections each of T-shape, embracing arms 75 and stem portion 76. These parts will be semi-circular with the arms of the different sections enclosing an area of tube 37 adjacent its opening 74. The stem portions 76 will enclose the base portion of cannula 67 and its hub 68, 71 and 72, as well as sleeve 73. As shown especially in FIG. 12 adjacent one edge, a casing section will involve a reduced and stepped zone 77 having an outwardly projecting portion 78. Adjacent its opposite edge its inner face will be recessed to accommodate the stepped portion 77 and will additionally be provided with an overlapping part 79. As casing sections are pressed towards each other and due to their flexibility, the overlapping part 79 will snap over the projecting portion 78 to thus furnish a latch or detent structure securing the sections against detachment from each other. A similar structure is conveniently embodied in the casing sections 61 as afore described.

The stem areas 76 of the casings are provided within their bore zones with arcuate ribs 80. These are spaced from each other a distance such that the enlarged hub portion 71 will be accommodated between them. Similarly, the arms 75 are provided with arcuate and longitudinal ribs 81. The latter—with the parts assembled—prevents rotation of tube 37. The cannula 67 is connected with tube 37 between the central pair of these ribs. A yielding packing strip 82 of arcuate configuration may be disposed on that face of tubing 37 opposite opening 74 to assure proper support of the parts after heat sealing is accomplished and with the assembly completed as in FIG. 11. Finally, it will be noted that the outer ends of stems 76 terminate in inwardly extending flanges 83; the space between the inner faces of the same and the adjacent rib 80 being sufficient to accommodate the base portion 70 of sheath 69.

In using a transfusion and blood storage set as described, the main receptacle will be suitably supported. The eyelet or ring members will be distributed on tube 37 to provide the desired number of aliquots between the needle assembly of FIG. 9 and the receptacle body. The needle 54 will be introduced into the donor's vein; the position-indicating element 65 assuring the technician as to the disposition of the needle bevel. Blood will therefore flow through tube 37 to fill the receptacle, after which needle 54 will be withdrawn. At that stage of procedure, by employing a tool of the type shown in FIGS. 14 to 16 inclusive, the eyelets or rings 41–44 may be crimped or deformed to seal off desired sections of the tube. One of those sections will extend from the receptacle interior to beyond the latter. With the seal having been established there will be no danger of the blood escaping from the receptacle which will now be in completely sealed condition. One or more aliquots filled with blood may be provided by cutting between the eyelets or rings. Any residual blood within tube 37, after withdrawal of the needle 54 from the vein of the donor, may be deposited within the receptacle 25 by simply projecting cannula 67 through the perforable seal 26. Thereupon the vacuum condition within the interior of receptacle 25 will assure the transfer of blood into its interior.

It will be borne in mind that under all circumstances the technician will have no difficulty in determining that the apparatus or assembly is in the same sterile condition initially provided for its parts. In this connection it will be noted that in order to employ the assembly it is primarily necessary to remove sheath 55 from needle 54. This is accomplished by a simple stripping operation involving an axial pull which causes base portion 56 of the sheath to be drawn through the space existing between the flanges 63 of casing section 61. Once so withdrawn it will be impossible to reposition the sheath, in that casing sections 61 may not be detached from each other once they are assembled. Similarly, to render cannula 67 available it is necessary to strip sheath 69 from the hub assembly and through the space defined between tip 68 and flanges 83.

The specimens contained in the aliquot or aliquots and/or in a receptacle such as 25 will be adequate for sampling and test purposes. Data in this connection may be applied to the face of the receptacle in accordance with conventional practice and the filled receptacle may be similarly stored. When it is desired to discharge the blood from the receptacle all that will be necessary, in the structure of FIG. 1, will be for the technician to separate the layers defining the flaps 29 by tearing the latter along the zones indicated. This will expose the upper end of one or both of the tubes 33. A cannula connected in the usual manner with a tube is caused to pierce the partition 36 to thus establish communication with the interior of the receptacle. That receptacle is conveniently supported from its base end so that under gravity flow its contents are discharged.

If it is desired, a structure different from that involving flaps 29 could be employed for enclosing the upper ends of tubes 33. For example, as shown in FIGS. 18 and 19, tabs 90 could be thus provided as integral parts of walls 20, or otherwise. These tabs would be adhered to each other throughout a zone as indicated at 91 to completely segregate the upper ends of the tubes. The adjacent ends of the tabs (or at least one of them) would be roughened as indicated at 92. This would prevent adhesion of their surfaces to each other. Accordingly, they could be readily separated to rupture zone 91 and afford access to the upper tube ends. Also, these tabs could have their upper edges include opposed tangentially extending surfaces to furnish an overlap structure. In this manner, the physician or technician would have no difficulty in grasping the separate tab ends in order to separate them.

Thus, among others, the several objects of the invention as specifically formulated, are achieved. It is apparent that numerous changes in construction and rearrangements of the parts may be resorted to without departing from the spirit of the invention as defined in the claims.

We claim:

1. Blood transfusion and collecting apparatus comprising: a flexible tube made of plastic material for conducting the blood to be collected and at least two spaced clamping assemblies on said tube for separating and sealing off sections of the tube, each of the clamping assemblies initially being arranged in prescribed spaced relationship from each other to provide tube sections in which separate aliquots of blood of substantially prescribed volume are adapted to be collected, each of the clamping assemblies including a pair of curved clamping portions each of a predetermined width extending around the tube in frictional engagement therewith in immediately adjacent tandem relationship to each other, said curved clamping portions having retaining means for initially frictionally retaining the clamping portions on the tube in relatively fixed relationship in order to cooperate in obtaining the sealed separate aliquots of blood of prescribed volume, said clamping portions being made of a substantially permanently deformable material and being so constructed and arranged to be separately crimped and compressed to squeeze the blood into the adjacent tube sections and to substantially permanently retain this deformed shape and to provide a relatively wide area seal substantially across the width of the deformed clamping portions to seal off the adjacent sections from each other, each of said clamping portions being adapted to be independently deformed to provide a substantially curved part of the wide area seal in transverse section to assure maintenance of the formed wide seal area, and means for permitting the tube to be severed between the crimped clamping sections with substantially any cutting instrument and tool to separate the sections from each other while confining the contents thereof to thereby provide sealed aliquots of blood of prescribed volume.

2. Blood transfusion and collecting apparatus as set forth in claim 1 in which the said pair of curved clamping portions are integrally connected to each other by a thin, relatively frangible connecting portion.

3. Blood transfusion and collecting apparatus as set forth in claim 1 in which the said pair of curved clamping portions are separate from each other but are arranged in immediately adjacent relationship.

4. Blood transfusion and collecting apparatus as set forth in claim 1 in which the retaining means of said curved clamping portions include partially compressed sectors to cooperate in retaining the clamping portions in relatively fixed relationship.

5. A transfusion and blood storage set made of plastic material comprising a receptacle for collecting blood, a flexible tube for conducting blood to the receptacle and connected to the receptacle at one end and having a cannula mounted at the other end, said tube being provided with an outlet aperture extending through the side wall thereof at a point intermediate the cannula and the receptacle, a blood outlet assembly applied to the tube at the point where the outlet aperture is formed and provided with a cannula projecting laterally from the tube, said outlet assembly being provided with a cylindrical casing surrounding the tube and with a laterally projecting cylindrical stem portion and being formed of two complementary half sections having interlocking, non-releasable projecting tabs and detents and a cannula fixedly mounted in the stem of the outlet assembly and having communication at its inner end with the outlet aperture and having a sheath assembly removably applied thereto so as to prevent the escape of liquids through the cannula while applied thereto.

6. A transfusion and blood storage set as set forth in claim 5 in which the stem of the outlet assembly is formed with an inwardly projecting flange at its lower end and the sheath is provided with a collar which engages with the flange to releasably retain it in place, and which prevents reassembly after removal of the sheath.

7. Blood transfusion and collecting apparatus made of plastic material comprising: a flexible tube for conducting blood and a cannula mounting assembly at one end thereof comprising a cannula formed with a hub adjacent one end having connection with the end of the tube, a pair of complementary, semi-cylindrical casing sections assembled around the hub and a portion of the cannula and having non-releasable, interlocking projecting tabs and detents and formed with an inturned flange, and a sheath assembled around the cannula and having an external collar interengageable with the flange to releasably retain the sheath in place and prevent reassembly after removal.

8. Blood transfusion and collecting apparatus made of plastic material comprising a flexible tube for conducting blood and a cannula mounting assembly at one end thereof comprising a needle formed with a beveled point at one end and a hub adjacent the other end having connection with the tube and formed with a laterally projecting indicator for indicating the relative position of the bevel and complementary, semi-cylindrical casing sections assembled around the hub and a portion of the cannula, and having interengageable retaining means for holding the sections in assembled relationship and formed with an aperture accommodating the laterally projecting indicator so that it is exposed therethrough to indicate the relative position of the bevel.

9. Blood transfusion and collecting apparatus made of plastic material comprising: a flexible tube for conducting blood and a cannula mounting assembly at one end thereof comprising a cannula formed with a beveled point at one end and a hub adjacent the other end having connection with the tube and formed with a laterally projecting indicator for indicating the position of the bevel and complementary semi-cylindrical casing sections assembled around the hub and a portion of the cannula and having non-releasable, interlocking, projecting tabs and detents for holding the sections in assembled relationship and also formed with an aperture to accommodate the laterally projecting indicator so that it is exposed therethrough to indicate the relative position of the bevel.

References Cited

UNITED STATES PATENTS

| | | | |
|---|---|---|---|
| 742,762 | 10/1903 | Walsh | 128—218 |
| 1,274,081 | 7/1918 | Riethmueller | 128—221 |
| 2,343,064 | 2/1944 | Kjorsvik | 206—56 |
| 2,626,608 | 1/1953 | Garland | 128—346 |
| 2,648,463 | 8/1953 | Scherer | 206—56 |
| 2,722,932 | 11/1955 | Hickey | 128—214 |
| 2,780,225 | 2/1957 | Barr et al. | 128—272 |
| 2,894,510 | 7/1959 | Bellamy | 128—272 |
| 2,896,619 | 7/1959 | Bellamy | 128—214 |
| 2,940,444 | 6/1960 | Beall | 128—214 |
| 2,955,595 | 10/1960 | Semple | 128—214 |
| 3,008,570 | 11/1961 | Roehr et al. | 128—218 |
| 3,029,815 | 4/1962 | Roehr | 128—221 |
| 3,079,900 | 3/1963 | Bellamy | 128—214 X |
| 3,082,794 | 3/1963 | Wahl | 251—4 X |
| 3,123,072 | 3/1964 | Bellamy | 128—221 |
| 3,276,447 | 10/1966 | Hamilton | 128—214 |

RICHARD A. GAUDET, *Primary Examiner.*

ROBERT E. MORGAN, *Examiner.*

D. L. TRULUCK, *Assistant Examiner.*